United States Patent
Tang et al.

(10) Patent No.: US 6,357,114 B1
(45) Date of Patent: *Mar. 19, 2002

(54) HYDRAULIC EXPANSION PRE-STRAINING OF HEAT EXCHANGER TUBING

(75) Inventors: Jun Tang, Cambridge; Roderick J. McGregor, Montreal, both of (CA)

(73) Assignee: Babcock & Wilcox Canada, Ltd., Cambridge (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/432,564

(22) Filed: Nov. 1, 1999

(51) Int. Cl.$^7$ .............................................. B21D 39/08
(52) U.S. Cl. ............................ 29/890.044; 29/890.053; 29/446
(58) Field of Search ..................... 29/890.053, 890.044, 29/727, 723, 446, 452, 421.1, 890.043; 33/DIG. 13; 72/58, 56, 54, 370.07, 370.22, 370.06

(56) References Cited

U.S. PATENT DOCUMENTS

| | | | | | |
|---|---|---|---|---|---|
| 4,125,937 A | * | 11/1978 | Brown et al. | .................. | 29/727 |
| 4,649,492 A | * | 3/1987 | Sinha et al. | ........... | 29/890.044 |
| 4,727,635 A | * | 3/1988 | Krips et al. | ............ | 29/890.044 |
| 4,802,273 A | * | 2/1989 | Widart | ........................ | 29/727 |
| 4,827,605 A | * | 5/1989 | Krips et al. | .................... | 29/727 |
| 4,858,296 A | * | 8/1989 | Gray | ........................... | 29/727 |
| 4,889,679 A | * | 12/1989 | Snyder et al. | ......... | 29/890.044 |
| 5,027,507 A | * | 7/1991 | Nelson et al. | ......... | 29/890.044 |
| 5,301,424 A | * | 4/1994 | Snyder | ................... | 29/890.044 |
| 5,752,311 A | * | 5/1998 | Snyder | .................. | 29/890.044 |
| 5,752,317 A | * | 5/1998 | Keating et al. | ........ | 29/890.044 |

* cited by examiner

Primary Examiner—I Cuda Rosenbaum
Assistant Examiner—T. Nguyen
(74) Attorney, Agent, or Firm—Robert J. Edwards; Eric Marich; Kathryn W. Grant

(57) ABSTRACT

A method of hydraulically prestraining the tubes of a once-through steam generator by welding the tubes to their respective tubesheets prior to the application of hydraulic expansion to produce tensile stresses which shorten the tubes an equal and predetermined amount to increase the margin to buckling and increase the natural frequency of the tubes reducing flow induced vibration.

14 Claims, 4 Drawing Sheets

HYDRAULIC EXPANSION PRE-STRAINING OF HEAT EXCHANGER TUBING

FIELD AND BACKGROUND OF THE INVENTION

The invention relates generally to heat exchangers and more particularly to the pre-treatment of tubes for such heat exchangers.

DESCRIPTION OF THE PRIOR ART

The once-through steam generators or heat exchangers, associated with nuclear power stations and which transfer the reactor-produced heat from the primary coolant to the secondary coolant that drives the plant turbines may be as long as 75 feet and have an outside diameter of about 12 feet. Within one of these heat exchangers, tubes through which the primary coolant flows may be no more than ⅝ inch in outside diameter, but have an effective length of as long as 52 feet between the tube-end mountings and the imposing faces of the tubesheets. Typically, there may be a bundle of more than 15,000 tubes in one of these heat exchangers.

In the construction of a once-through steam generator, a plurality of these small diameter long length tubes are configured in a square array where they are welded at their top and bottom ends to a tubesheet to maintain this array in the once-through steam generator.

The original once-through steam generators were fabricated using a sequence where tubes, prior to welding to both tubesheets, were individually electrically heated such that cooling of the hot tubes after welding to the tubesheet resulted in tensile strains. This fabrication method is not recommended since in the thermal method of tube prestraining used on the original once-through steam generator the tubes were heated individually until the desired thermal strain was achieved and then seal-welded in place. Thus, for the first seal welded tubes, the desired prestrain was achieved exactly. As the procedure progressed, the previously welded tubes cooled and started to load the secondary shell and the tubesheets. In response, these components deflected in the direction of the load and effectively decreased the length of the subsequently welded tubes. This mechanism introduced an unwanted, uncontrolled and undefined tensile strain in these tubes. Excessive tensile stress was detrimental to the tube life. In addition, thermal prestraining is an expensive and time consuming process.

Since both the tubes and the shell of the once-through steam generator are restrained by the tubesheets at both ends, interaction stresses develop during operation due to the relative deformation of the steam generator shell and the tubes. These interaction stresses come from several sources. (1) Both the primary and secondary pressures elongate the secondary shell of the vessel between the two tubesheets; (2) the combined action of the primary and secondary pressures changes the tube radius which, in turn, causes a length change of the tube ("Poisson effect"), or a stress from resisting that change; (3) the tube temperature varies along its length and is different from the lengthwise temperature distribution of the secondary shell. This causes differential expansion of the two; (4) the tubes have a higher coefficient of thermal expansion than the secondary shell which causes a differential expansion; (5) tubesheet bowing, created by primary and secondary pressures combined with induced shell and head deflection loads; and (6) the tube preload introduced during manufacturing.

In the case of the once-through steam generator, tube buckling is caused by deformation controlled loads and thus is not a catastrophic primary stress failure mode. However, analysis of a tube shows that tube touching would occur very soon after the tube assumed a bowed shape. Therefore, the load which causes tubes to touch is considered as the limit load on the tube in compression.

A slight manufacturing tube prestrain of about ⅛ inch over the length of the tube is considered beneficial to reduce compressive loads on the tubes under all operating conditions. This has the added benefit of preventing stress softening and the resultant reduction in tube natural frequency for flow induced vibration considerations.

In view of the foregoing it is seen that an improved method of prestraining the tubes of a once-through steam generator was needed which would not subject the tubes to interaction stresses during welding.

BRIEF SUMMARY OF THE INVENTION

The present invention solves the prior art once-through steam generator or heat exchanger assembly problems and other problems by providing a method of prestressing the once-through steam generator tubes in which the tubes of the once-through steam generator are prestrained to the desired level using the hydraulic expansion of the tubes in the tubesheet. Prior to performing the tube joint hydraulic expansion, both ends of the tubes are welded to their respective tubesheet. The subsequent tube radial expansion within the hydraulic expansion zone creates the desired axial preload. It has been demonstrated both analytically and experimentally that tensile stresses are developed during the hydraulic expansion of tubes which are restrained at both ends. The obtained stresses are of the desired magnitude to increase margin to buckling and increase tube natural frequency to thus increase the margin to detrimental flow induced vibration.

Optimized selection of the final total tube stress is controlled by controlling the length of hydraulic expansion in the upper tubesheet. The main advantage is that the developed prestrain is independent of the tube load prior to the expansion. Therefore, the achieved pre-set of a given tube will be independent of the state of the other tubes resulting in the desired uniform foreshortening of each tube.

A tensile prestrain of ⅛ inch over the tube length will assure that all tubing stress limits will be met and the tubes will be at a very low tensile stress of approximately 3 ksi during full power operation. This tensile prestrain is achieved by controlling the hydraulic expansion process.

In view of the foregoing it will be seen that one aspect of the present invention is to provide a prestraining method for once-through steam generator tube assemblies which will be constant for all the individual tubes.

Another aspect is to provide a prestraining method for once-through steam generator tubes once they are assembled into a once-through steam generator tube array.

These and other aspects of the present invention will be more fully understood from the following description of the invention when considered along with the accompanying drawings.

DETAILED DESCRIPTION OF THE PREFERRED EMBODIMENT

Figure 1:
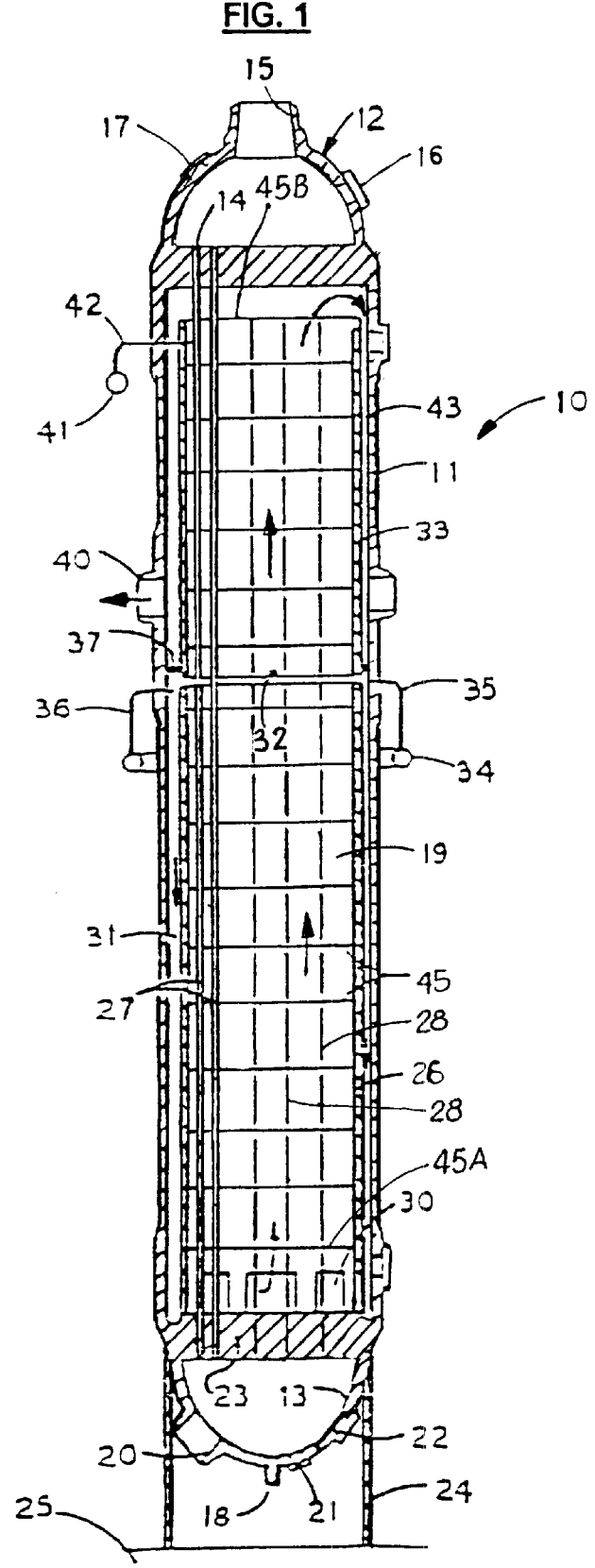
FIG. 1 is a vertical elevation view in full section of a once-through steam generator embodying the principles of the invention.

The present invention is described in connection with a once-through steam generator for a nuclear power plant, although these principles are generally applicable to shell and tube heat exchangers in any number of diverse fields of activities. Thus, as shown in FIG. 1 for the purpose of illustration, a once-through steam generator unit 10 comprising a vertically elongated cylindrical pressure vessel or shell 11 closed at its opposite ends by an upper head member 12 and a lower head member 13.

The upper head includes an upper tubesheet 14, a primary coolant inlet 15, a manway 16 and a handhole 17. The manway 16 and the handhole 17 are used for inspection and repair during times when the once-through steam generator unit 10 is not in operation. The lower head 13 includes a drain 18, a coolant outlet 20, a handhole 21, a manway 22 and a lower tubesheet 23.

The once-through steam generator 10 is supported on a conical or cylindrical skirt 24 which engages the outer surface of the lower head 13 in order to support the generator unit 10 above structural flooring 25.

As hereinbefore mentioned, the overall length of a typical once-through generator unit of the sort under consideration is about 75 feet between the flooring 25 and the upper extreme end of the primary coolant inlet 15. The overall diameter of the unit 10 moreover, is in excess of 12 feet.

Within the pressure vessel 11, a lower cylindrical tube shroud wrapper or baffle 26 encloses a bundle of heat exchanger tubes 27, a portion of which is shown illustratively in FIG. 1. In a once-through steam generator unit of the type under consideration moreover, the number of tubes 27 enclosed within the baffle 26 is in excess of 15,000, each of the tubes 27 having an outside diameter (OD) of ⅝ inch. It has been found that Alloy 690 is a preferred tube material for use in once-through steam generators of the type described. The individual tubes 27 in the bundle each are anchored in respective holes formed in the upper and lower tubesheets 14 and 23 through seal welding the tube ends at the tubesheets. To support the tubes 27 in their proper positions, and array of drilled and broached substantially flat support plates 45 is positioned transverse to the longitudinal axes of the tubes 27 and the axes of the pressure vessel 11.

The lower baffle or wrapper 26 is aligned within the pressure vessel 11 by means of pins (not shown). The lower baffle 26 is secured by bolts (not shown) to the lower tubesheet 23 or by welding to lugs (not shown) projecting from the lower end of the pressure vessel 11. The lower edge of the baffle 26 has a group of rectangular water ports 30 or, alternatively, a single full circumferential opening (not shown) to accommodate the inlet feedwater flow to the riser chamber 19. The upper end of the baffle 26 also establishes fluid communication between the riser chamber 19 within the baffle 26 and annular downcomer space 31 that is formed between the outer surface of the lower baffle 26 and the inner surface of the cylindrical pressure vessel 11 through a gap or steam bleed port 32.

A support rod system 28 is secured at the uppermost support plate 45B, and consists of threaded segments spanning between the lower tubesheet 23 and the lowest support plate 45A and thereafter between all support plates 45 up to the uppermost support plate 45B.

A hollow toroid shaped secondary coolant feedwater inlet header 34 circumscribes the outer surface of the pressure vessel 11. The header 34 is in fluid communication with the annular downcomer space 31 through an array of radially disposed feedwater inlet nozzles 35. As shown by the direction of the FIG. 1 arrows, feedwater flows from the header 34 into the once-through steam generating unit 10 by way of the nozzles 35 and 36. The feedwater is discharged from the nozzles downwardly through the annular downcomer 31 and through the water ports 30 into the riser chamber 19. Within the riser chamber 19, the secondary coolant feedwater flows upwardly within the baffle 26 in a direction that is counter to the downward flow of the primary coolant within the tubes 27. An annular plate 37, welded between the inner surface of the pressure vessel 11 and the outer surface of the bottom edge of an upper cylindrical baffle or wrapper 33 insures that feedwater entering the downcomer 31 will flow downwardly toward the water ports 30 in the direction indicated by the arrows. The secondary fluid absorbs heat from the primary fluid through the tubes 27 in the bundle and rises to steam within the chamber 19 that is defined by the baffles 26 and 33.

The upper baffle 33, also aligned with the pressure vessel 11 by means of alignment pins (not shown), is fixed in an appropriate position because it is welded to the pressure vessel 11 through the plate 37, immediately below steam outlet nozzles 40. The upper baffle 33, furthermore, enshrouds about one third of the tube bundle.

An auxiliary feedwater header 41 is in fluid communication with the upper portion of the tube bundle through one or more nozzles 42 that penetrate the pressure vessel 11 and the upper baffle 33. This auxiliary feedwater system is used, for example, to fill the once-through steam generator 10 in the unlikely event that there is an interruption in the feedwater flow from the header 34. As hereinbefore mentioned, the feedwater, or secondary coolant that flows upwardly through the tube bank 27 in the direction shown by the arrows rises into steam. In the illustrative embodiment, moreover, this steam is superheated before it reaches the top edge of the upper baffle 33. This superheated steam flows in the direction shown by the arrow, over the top of the baffle 33 and downwardly through an annular outlet passageway 43 that is formed between the outer surface of the upper cylindrical baffle 33 and the inner surface of the pressure vessel 11.

The steam in the passageway 43 leaves the generating unit 10 through steam outlet nozzles 40 which are in communication with the passageway 43. In this foregoing manner, the secondary coolant is raised from the feed water inlet temperature through to a superheated steam temperature at the outlet nozzles 40. The annular plate 37 prevents the steam from mixing with the incoming feedwater in the downcomer 31. The primary coolant, in giving up this heat to the secondary coolant, flows from a nuclear reactor (not shown) to the primary coolant inlet 15 in the upper head 12, through individual tubes 27 in the heat exchanger tube bundle, into the lower head 13 and is discharged through the outlet 20 to complete a loop back to the nuclear reactor which generates the heat from which useful work is ultimately extracted.

Figure 2:
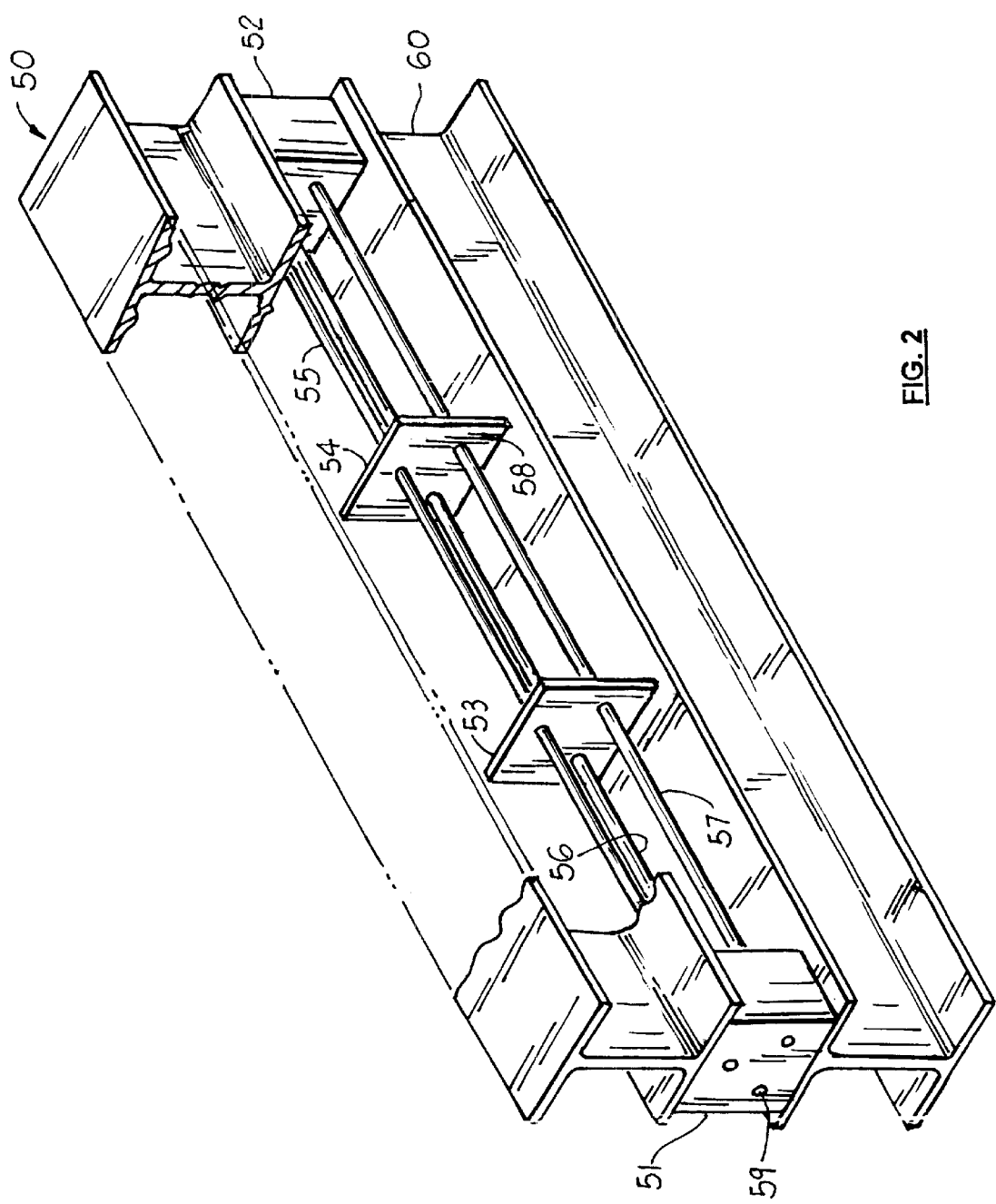
FIG. 2 is a perspective view of a test stand used to develop once-through steam generator tubing hydraulic stress verification data.
Figure 3:
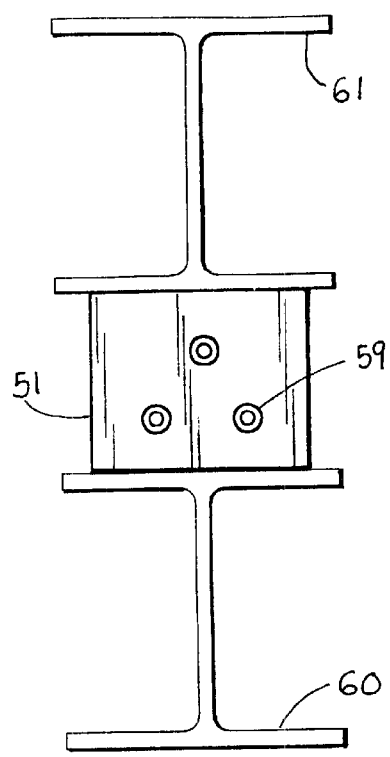
FIG. 3 is an end view of the FIG. 2 test stand.

Referring now to the drawings generally and FIGS. 2 and 3 in particular, it will be noted that a test stand or rig 50 has been designed to investigate two areas of special interest. (1) Explore the effects of tube insertion into a once-through steam generator configuration and (2) quantify residual strain during axially constrained hydraulic expansion of the tubes 27 alone.

The capability to accurately and analytically predict the hydraulic expansion mechanics was confirmed using finite element modeling as will be discussed later.

Generally, for once-through steam generator tube applications, the expansion takes place at each end of the straight tube which has both ends fastened by seal welds at the tubesheet. An expansion in a U-bend or free ended straight tube results in contraction of the free end of the tube. This contraction is in proportion to the length of the expansion in accordance with the Poisson effect. For a 26 inch expansion length, this axial movement has been observed to be approximately ⅛ inch. Expansion in a fixed ended tube induces strain to the tube instead. What is not known is the influence of the expansion zone plastic deformation in the distribution of the strain i.e. the strain in the tube could be evenly distributed throughout the expanded and unexpanded tube or could accumulate in the plastically flowing region. An even distribution is expected based on theoretical material mechanics; however, the magnitude must be verified to be analytically predictable so that it may be considered in the residual stress, flow induced vibration, and tube/shell interaction analyses of the once-through steam generator tube design.

The once-through steam generator proposed design consists of ⅝ inch OD, 0.038 inch wall Sumitomo Alloy 690TT on a ⅞ inch pitch. Tubesheets are sized at 22 inches thick each. Fifteen tube support probes exist over the bundle length.

The test rig 50 shown in FIGS. 2 and 3 has tube/hole and pitch geometries selected based on availability of equipment. The stand 50 includes two tubesheet blocks 51 and 52 gun drilled to a 0.93 inch triangular tube pitch, and two broached plates 53 and 54. The tubes 55, 56 and 57 are $^{11}/_{16}$ inch OD, 0.040 inch wall Sumitomo Alloy 690 TT. The broached plates 53 and 54 are of similar material and tube-to-hole clearance as the once-through steam generator broached plate 45, and holes 58 drilled to a 0.95 inch triangular tube pitch. The edge condition of the hole 58 is much rougher than the broached plate 45 hole to provide a conservative condition for tube abrasion assessment. The pitch of the drilled broached plates 53 and 54 for the test arrangement was larger than the pitch of the holes 59 of the tube sheet blocks 12 and 14. As such one central hole 59 was used to align the tube passage by typical production techniques with the surrounding holes 59 being progressively further out of alignment. The test holes were the aligned hole and an adjacent hole that represents a 0.020 inch offset of the tube passage. A third hole in the periphery of the pattern was used to assess tubeability and entry abrasion for a conservative out-of-tolerance offset, i.e., ~0.050 inch misalignment.

The assembly was mounted between heavy structural beams 60 and 61 to approximate the rigidity of the tubesheet/pressure boundary assembly, and offer stiffness in excess of the tubes 55, 56 and 57 being investigated.

The tubes 55, 56 and 57 were eddy current inspected for manufacturing burnish mark in full accordance with accepted testing procedures before insertion into the test rig 50.

The tube 55 was then inserted by normal practice into corresponding ideally aligned holes 58 and 59 while tube 56 was inserted into the holes 58 and 59 having a 0.020 inch displacement between the corresponding broached plate holes 58 and the tubesheet block holes 59. A third tube 57 was inserted into a peripheral hole 59 with ~0.050 inch offset relative to the corresponding broached plate holes 58. The ends of the inserted tubes 55, 56 and 57 were tack expanded at each end in preparation for welding.

Figure 4:
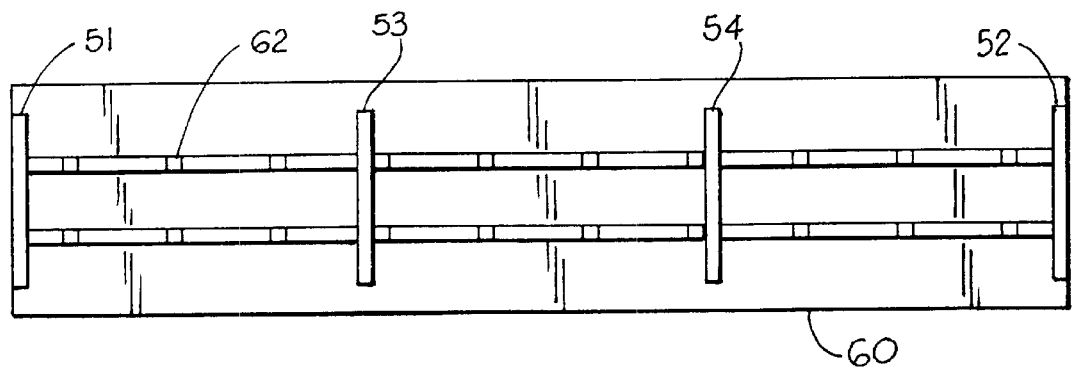
FIG. 4 is an expanded view of strain gauge location on two tubes of the FIG. 2 test stand.
Figure 5:
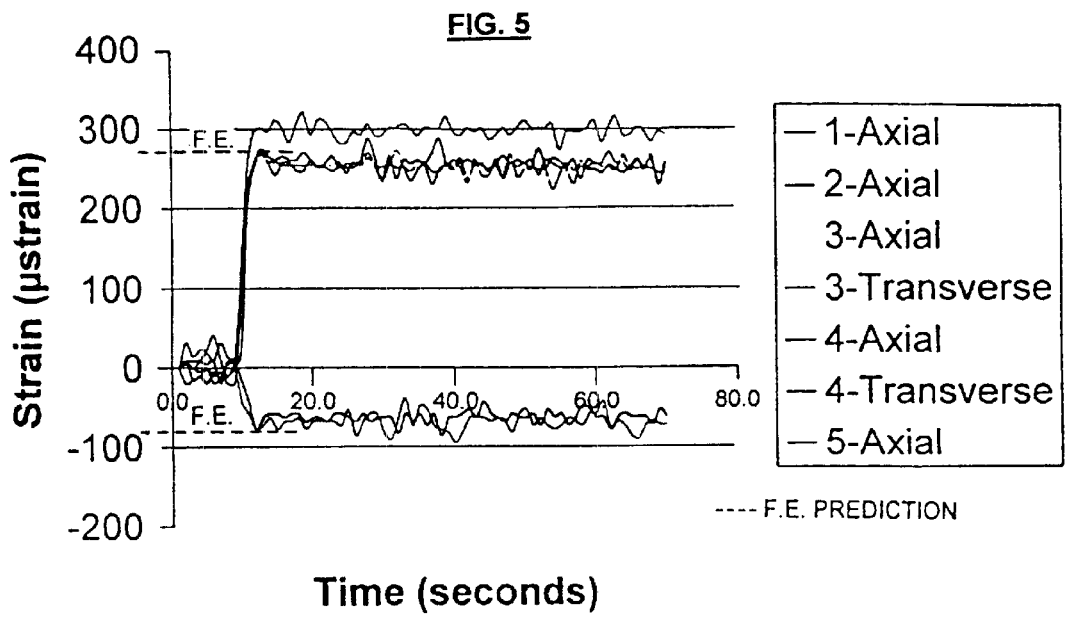
FIG. 5 depicts test results of a full tube length expansion strain.
Figure 6:
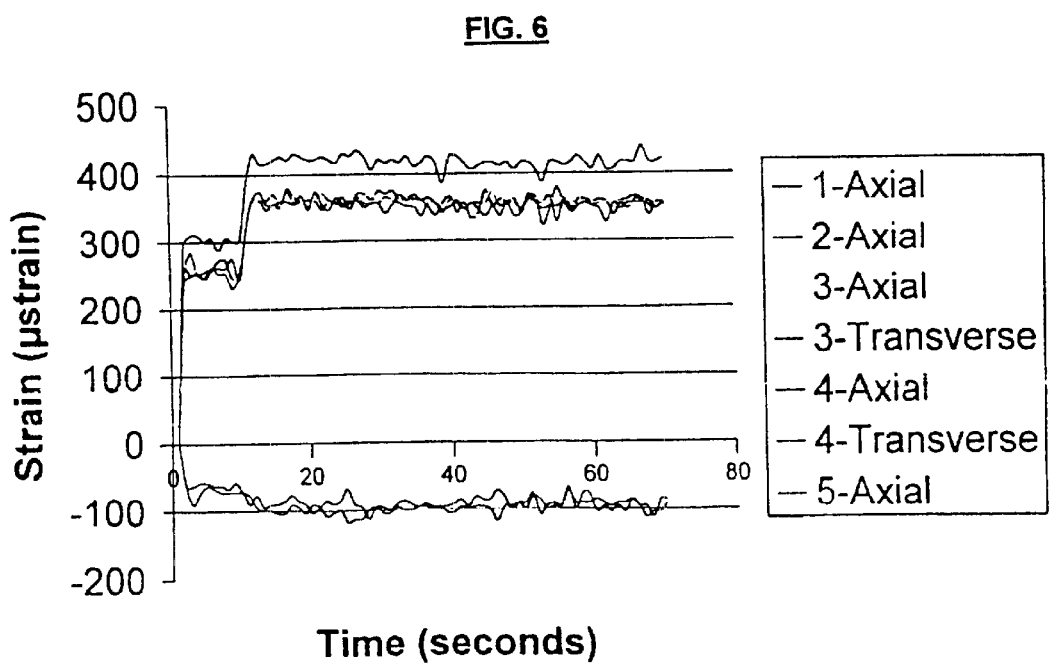
FIG. 6 depicts test results of half tube length expansion strain.

Ten strain gauges 62 were mounted and equally spaced across the free span of tube 55 and tube 56 as shown at FIG. 4. The tubes 55 and 56 were welded at their respective ends to tubesheet blocks 51 and 52. Each of the gauges 62 was used to measure tube expansion in an axial or transverse direction at its respective location, and strain data was then recorded to assess any imparted strains from the welding operation. Thereafter, tube 55 was full depth hydraulically expanded, i.e., 26%6 inch length, while the digital data acquisition system recorded the resulting strain development in the tube 55. After a cursory data review, the partial depth hydraulic expansion, i.e., 13.25 inch length at the second tubesheet block 52 was performed with strain data recorded. The process was then repeated for tube 56 at the full and partial depth hydraulic expansion as shown at FIGS. 5 and 6, respectively.

Eddy current evaluation was performed on the two completely assembled/instrumented tubes 55 and 56 and the tube 57 which had been inserted into the 0.050 inch offset tube holes 58 and 59.

After two weeks, tube 55 was cut at a point ~8 inch from the first, i.e., full depth hydraulically expanded, tubesheet block 51 and the strain relaxation was measured with a dial gauge.

A linear elastic plastic finite element model of the experimental test stand 50 was developed to provide comparative analytical predictions of the strain development with hydraulic expansion. The model was an adaptation of the 3-D axisymmetric hydraulic expansion model developed for in-house Tube to Tubesheet Joint Qualification Programs.

Tubes 55 and 56 were inserted through exactly aligned and 0.020 inch offset corresponding holes 58 and 59 and passed through both tubesheet holes 59 and broached plate holes 58 with no substantial resistance relative to U-tube steam generator tubing experience. Mild resistant 'stop and starts' were encountered by the tubes 55 and 56 as they were passed through the first tubesheet hole 59 which is a typical response to 'eyeball' estimation of a perpendicular entry alignment of the tube at the beginning of its insertion. Experience has shown that once the tube is sufficiently inserted, it guides itself and resistance is virtually eliminated.

Slight resistance was sensed on insertion of the tube 57 through the corresponding 0.050 inch offset holes 58 and 59. However, this was well within the range of experience with pressurized once-through steam generator tube insertion. Manual thumb pressure on the tube end was sufficient to smoothly move the tube 57 into position.

The eddy current evaluation showed no manufacturing burnish mark in any of the tubes before or after insertion and expansion, when subjected to eddy current test processes and criterion suitable to typical Baseline evaluations.

Visual evaluation indicated superficial discontinuity in the tube surface finish on tubes 55 and 56. A mild burnish was visible on tube 57 which had no raised metal or discernible depth relative to calibrated scratch standards i.e., <0.0005 inch.

No strains in the tube free span were detectable from the welding operation. In response to hydraulic expansion, the strain gauges showed strain development in the free span of both tubes 55 and 56 that was uniform and consistent throughout. Finite element prediction of the expansion strain was shown as very close to that experimentally measured on tube 56 as shown in FIG. 5. The strain levels as experimentally measured on tube 56 increased again by an expected 50% in response to the second tubesheet expansion of half the length of the original as seen in FIG. 6.

After two weeks, tube 55 was cut and the strain relaxation was measured with a dial gauge. This was intended to investigate any unknown relaxation effects. The tube relaxed over 0.130 inch which is comparable to prediction by the finite element model.

The development of the strains to predicted levels shows that the plastic expansion regions have not absorbed a disproportional share of the strain due to unexpected non-linearities. The strain is uniformly distributed throughout the expanded and free span regions. It is repeatable, analytically predictable, controllable (by setting expansion length) and permanent under the conditions tested in this experiment.

No manufacturing burnish marks were detected by eddy current testing in spite of attempts to create a worst case tube passage.

From the foregoing test results it is seen that hydraulic prestressing of once-through steam generator tubes is possible when done according to the developed empirical data.

It will be understood that certain modifications and improvements obvious to people of ordinary skill in this art area were deleted herein for the sake of conciseness and readability. It is intended, however that all such be included in the scope of the following claims.

What is claimed is:

1. A method of pre-straining a small diameter, long length tube to increase buckling margin and reduce induced vibration comprising tying down both ends of the tube to a secure plate and applying a hydraulic pressure to the inside surface of the tube for a length of the tube corresponding to a predetermined depth within the plate to produce a desired tensile prestrain that is uniformly distributed throughout the tube and that is produced solely via hydraulic pressure.

2. A method as set forth in claim 1 wherein the tube is a once-through steam generator tube.

3. A method as set forth in claim 2 wherein tying down of tube ends includes the welding of the tube ends to tubesheets located at these ends.

4. A method as set forth in claim 3 including a plurality of once-through steam generator tubes aligned into an array and having their ends welded to the tubesheets located at the ends of the tubes.

5. A method of pre-straining a tube of a heat exchanger, comprising:
   a. anchoring a first end of a tube to a first tubesheet;
   b. anchoring a second end of the tube to a second tubesheet;
   c. hydraulically expanding at least one end of the tube into one of the first and second tubesheets to produce a tensile prestrain uniformly distributed throughout the expanded and unexpanded regions of the tube; and
   d. controlling the length of the expanded region to produce a pre-selected tensile prestrain.

6. The method of claim 5 including a plurality of tubes aligned into an array and comprising controlling the length of the expanded region within each tube to produce a pre-selected tensile prestrain.

7. The method of claim 6, wherein the length of the expanded region within each tube is individually selected to produce substantially the same tensile among the tubes.

8. The method of claim 7, wherein the pre-selected tensile prestrain is ⅛" along the length of each tube.

9. The method of claim 6, wherein each tube is hydraulically expanded into the upper tubesheet.

10. The method of claim 6, wherein the anchoring steps comprise welding.

11. The method of claim 10, wherein the first end of each tube is tack expanded into the first tubesheet prior to welding to the first tubesheet, and the second end of each tube is tack expanded into the second tubesheet prior to welding to the second tubesheet.

12. A method of pre-straining the tubes of a heat exchanger, comprising;
   a. welding a first end of each tube to an upper tubesheet;
   b. welding a second end of each tube to a lower tubesheet;
   c. hydraulically expanding the first end of each tube into the upper tubesheet to produce a tensile prestrain uniformly distributed along the expanded and unexpanded regions of each tube; and
   d. wherein the length of the expanded region of each tube is individually selected to produce substantially the same tensile prestrain among the tubes.

13. The method of claim 12, wherein the tensile prestrain is produced solely by hydraulically expanding each tube.

14. The method of claim 12, wherein the first end of each tube is tack expanded into the first tubesheet prior to welding to the first tubesheet, and the second end of each tube is tack expanded into the second tubesheet prior to welding to the second tubesheet.

* * * * *